Patented July 5, 1927.

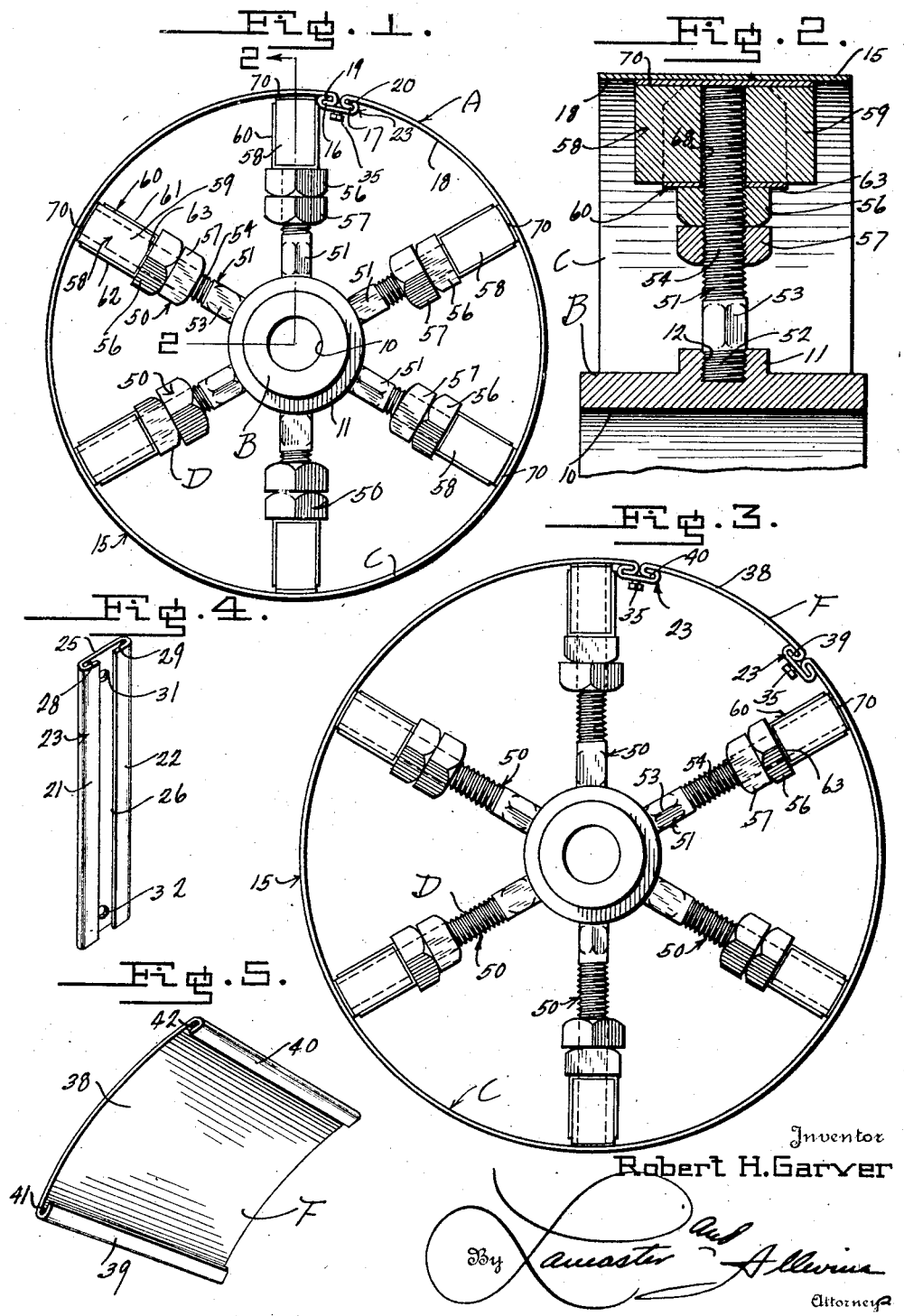

1,634,285

UNITED STATES PATENT OFFICE.

ROBERT H. GARVER, OF DRUMMOND, IDAHO.

EXPANSION PULLEY.

Application filed May 18, 1925. Serial No. 31,142.

This invention relates to improvements in expansible pulley wheels.

The primary object of this invention is the provision of a novel type of pulley wheel embodying a construction, by which the rim portion may be adjusted to different diameters, and accurately held in such adjustment.

A further object of this invention is the provision of an improved expansible pulley wheel, embodying a novel type of expansible rim, and novel means to expand the same and hold it in such position.

Other objects and advantages of this invention will be apparent during the course of the following detailed description.

In the accompanying drawing, forming a part of this specification, and wherein similar reference characters designate corresponding parts throughout the several views, Figure 1 is a side elevation of the improved pulley wheel, showing the same contracted to substantially its minimum diameter.

Figure 2 is an enlarged sectional view taken substantially on the line 2—2 of Figure 1.

Figure 3 is a side elevation of the pulley wheel, expanded, showing the novel type of segmental rim portion, and the means to hold the same expanded.

Figures 4 and 5 are perspective views showing details of the pulley wheel rim.

In the drawing, wherein for the purpose of illustration is shown only a preferred embodiment of this invention, the letter A may generally designate the improved pulley wheel, which may comprise a hub B; rim C; and means D in the nature of adjustable spokes to hold the rim C in its desired expanded or contracted relation with respect to the hub B.

The hub C is of the conventional type, providing the spindle receiving passageway 10 therethrough, and at the outer periphery thereof the same is provided with the raised annular portion 11, which is provided with a plurality of radially disposed internally screw threaded sockets 12 for detachably receiving features of the spoke means D.

The rim C is of novel construction, and is preferably formed of sheet metal, although the same may be made of other materials. It comprises the main body portion 15, which at the ends thereof is provided with the hooked flange portions 16 and 17, turned in at the inside periphery 18 of the rim body 15, to provide sockets 19 and 20, adapted to detachably receive the retaining flange portions 21 and 22 of a retainer member 23, which is of elongated formation, and preferably of uniform width from end to end, and in length equivalent to the width of the pulley rim. This retainer member 23, as is illustrated in Figure 4 of the drawing includes the body portion 25, beneath which the retaining flanges 21 and 22 above mentioned are bent, in spaced relation; the retaining flanges preferably lying in the same plane, and having the free edges thereof spaced, to provide the space or openings 26, into which the flanges 16 and 17 of the rim body 15 may be snapped, into position in the sockets 28 and 29 provided between the body 25 of the member 23 and its retaining flanges 21 and 22 respectively, as is apparent from the drawing. The body portion 25 of the connecting member is preferably provided with screw threaded openings 31 and 32 therein, directly over the space 26 between the edges of the retaining flanges 21 and 22, for the purpose of receiving adjusting set screws 35, which when the connector 23 is in position enter into the space at the joint of the ends of the body 15 of the rim, to force them apart, and to force the flanges 16 and 17 of the rim body 15 firmly into the sockets 28 and 29 of the connector 23, and as is apparent from Figure 1 of the drawing. The above description designates the rim C connected to provide a pulley wheel of minimum diameter. It is possible to vary the diameter of the rim C by adding sections F, such as is illustrated in Figures 3 and 5 of the drawing. These sections F each include an arcuate body 38, which at the ends thereof is provided with retaining flanges 39 and 40, bent at the concave side of the body 38, to provide the sockets 41 and 42, adapted to receive retaining flange portions 21 or 22 of the connector pieces 23; it being understood that two of the connector pieces 23 are used, when one of the extension segments F are used; the connectors 23 being attached as is illustrated in Figure 3 of the drawing, and in the same manner as above described for connecting the ends of the rim body 15.

Referring to the means D for holding the rim C in expanded condition, the same comprises a plurality of the extensible spoke arrangements 50, which are each of the same construction, comprising a bolt shank 51, each having a screw threaded inner end 52 for detachable connection in a screw threaded socket 12 at the hub B, and immediately above the screw threaded portion 52 providing a polygonal wrench engaging portion 53 just outwardly of the hub band 11. From the polygonal portion 53 to the extreme free end thereof, the bolt member 51 is screw threaded, as at 54, for the adjustable reception of outer and inner nuts 56 and 57 respectively. At the outer end of each bolt 51, a polygonal shaped follower 58 is positioned, which comprises the block shaped body 59, encased in a substantially U-shaped protecting casing 60; this casing 60 including the side flanges 61 and 62, and the connecting portion 63 which is adapted to lie beneath the block shaped body 59, and which is provided with an opening therethrough adapted to receive the shank of the bolt 51; it being understood that a passageway 68 is provided through the block 59, which also receives the bolt 51. The nut 56 is adjustable upon the screw threaded portion 54 of the bolt 51, in order to move the follower 58 outwardly along the bolt to the desired position. The follower 58 is really slidable longitudinally on the bolt, and it is adjusted and held in its most outward relation to the shank or bolt 51, by means of the nut 56. The nut 57 is adjustable to lock against the nut 56, to hold the latter in definite adjusted position. At its extreme outer face the follower 58 is preferably provided with a leather, fiber, or other friction piece 70, adapted to abut against the inside periphery 18 of the rim C, in order to hold the rim C in a definite relation upon the spoke 50, against lateral displacement; it being understood that there is no positive connection between the spokes 50 of the rim C, other than this frictional engagement between the follower casing 70 and the rim C.

From the foregoing description of this invention it is apparent that a novel type of pulley wheel has been provided which may be expanded to a desired diameter, to accommodate a belt of a particular length, and to take up play in the belt from time to time. The extension segments F insure that the rim of the pulley wheel will have an unbroken circumference, and this is important, since thereby slots, openings, and the like in the rim are obviated. The extension segments F may be sold as parts for the improved expansible pulley wheel A; may be readily fabricated; or sold as accessories in connection with a pulley wheel rim to be expanded to a particular diameter.

Various changes in the shape, size, and arrangement of parts may be made to the form of invention herein shown and described, without departing from the spirit of the invention or the scope of the claims.

I claim:

1. As an article of manufacture a wheel rim including a main body portion of sheet metal having the ends thereof turned inwardly of the inner periphery to provide sockets, a connecting piece including a body having spaced retaining flanges providing sockets adapted to detachably receive the underturned flanges of the main body portion to connect the same, and set screw means carried by the body portion of said connecting piece radially at the inner periphery of the rim for adjustment into the joint at the ends of the main body portion to force the same into the sockets of said connecting piece.

2. As an article of manufacture an expansible pulley comprising a rim, a hub, screw threaded shanks radially extending from the hub, a nut for each of said shanks adjustable therealong, a follower for each of said shanks having a passageway therethrough for receiving its shank, said follower including a block portion and a U-shaped metal casing against which its respective nut may abut, and facing material at the outside of the block adapted to engage the inside periphery of the rim as the nut is adjusted along the shank to force the follower into engagement with the rim.

3. As an article of manufacture a wheel rim including a main body portion having the ends thereof turned inwardly at the inner periphery thereof, an auxiliary extension segment having the ends thereof inturned at the inner side thereof similar to the ends of the rim, and channel shaped connecting pieces connecting the inturned ends of the rim and segment with the segment interposed between the ends of the rim.

4. As an article of manufacture an expansion pulley comprising a rim, a hub, screw threaded shanks radially extending from the hub, a nut for each of the shanks radially adjustable therealong, a follower slidable longitudinally on each of the shanks having a passageway therein for receiving the shank, and a piece of friction material at the outer side of the follower opposite the nut to be forced in engagement with the inner periphery of the rim upon adjustment of the nut along the shank to form the sole means of connecting the hub with the rim against relative circumferential movement.

ROBERT H. GARVER.